United States Patent [19]

Darton et al.

[11] Patent Number: 4,648,078

[45] Date of Patent: Mar. 3, 1987

[54] REMOTE CALIBRATION OF ACOUSTIC TRANSDUCER ARRAY

[75] Inventors: Kenneth S. Darton, Bishops Stortford; Jonathan P. Larsen, Stotford, both of United Kingdom

[73] Assignees: Britoil Public Ltd. Co.; Standard Telephone and Cables Ltd. Co., both of London, England

[21] Appl. No.: 661,816

[22] Filed: Oct. 17, 1984

[30] Foreign Application Priority Data

Oct. 18, 1983 [GB] United Kingdom ................ 8327869

[51] Int. Cl.$^4$ ............................................ H04R 29/00
[52] U.S. Cl. .................................... 367/13; 73/1 DV; 310/317; 310/319; 310/337
[58] Field of Search ................... 367/13, 20; 73/1 DV; 310/317, 319, 337, 338

[56] References Cited

U.S. PATENT DOCUMENTS

| | | | |
|---|---|---|---|
| 4,233,677 | 11/1980 | Brown et al. | 367/13 |
| 4,300,218 | 11/1981 | Kruka et al. | 367/20 |
| 4,434,648 | 3/1984 | Drost et al. | 367/13 |

FOREIGN PATENT DOCUMENTS 1594663  8/1981  United Kingdom .

Primary Examiner—Thomas H. Tarcza
Assistant Examiner—Daniel T. Pihulic
Attorney, Agent, or Firm—Kerkam, Stowell, Kondracki, Clarke

[57] ABSTRACT

An array of acousto-electric transducers 1,2, e.g. a hydrophone streamer, is calibrated by disconnecting the common ground wire 17, to which all the transducer shields 14 are connected, from ground and connecting it instead to a local oscillator 18. Test signals from the oscillator are capacitively coupled into each transducer via the inherent capacitances of the insulated lead throughs 15, 16 in the transducer shields 14.

2 Claims, 1 Drawing Figure

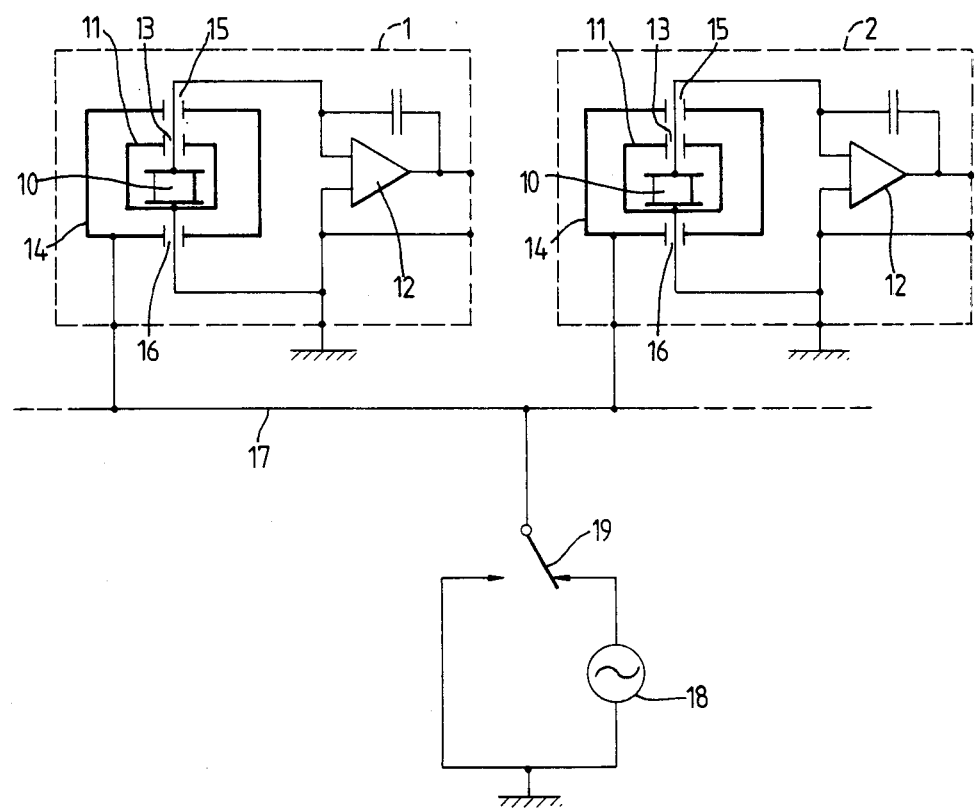

REMOTE CALIBRATION OF ACOUSTIC TRANSDUCER ARRAY

This invention relates to a method and means for remote testing and calibration of shielded acousto-electric transducers, e.g. acoustic sensors such as are used in hydrophone or geophone arrays.

Hydrophone or geophone arrays comprising large numbers, e.g. several hundreds, of individual substantially identical acousto-electric transducers, or microphones, are very sensitive structures and require to be calibrated before use. Subsequently they may require testing and re-calibration to determine any faults or deterioration in performance.

Individual acousto-electric transducers used in such arrays generally comprise an acousto-electric element contained in a pressure sensitive metal casing which, in hydrophone applications, is in turn contained within a larger protective metal shield. The larger shield is perforated to allow the inner metal casing to be in contact with a surrounding fluid medium via which sound waves are propagated to be detected at the pressure sensitive inner casing. Electrical connections to the transducer pass through insulating lead-throughs in the shield and inner casing, the inner casing usually being electrically connected to one of the transducer electrodes. The transducer is connected across the two inputs to a charge amplifier, i.e. a very sensitive amplifier that can receive input signals of the order of microvolts and produce output signals of sufficient amplitude for transmission over multiplexed bus lines which may be several hundred metres in length.

In order to calibrate and test such arrays it is necessary to provide each transducer with a test signal of predetermined characteristics and to measure the consequent outputs of the transducers. Providing accurate test signals for a complete hydrophone array poses problems for the operator.

According to the present invention there is provided a method of testing and calibrating an array of acousto-electric transducers wherein the transducers are each supported in individual metal shields and electrically connected to external circuitry via insulated lead-throughs, the shields each being connected to a common ground wire, characterised in that the ground wire is disconnected from ground and is connected instead to a source of test signals whereby a test signal is capacitively coupled into all the transducers simultaneously via the inherent capacitances of the shield lead-throughs.

An embodiment of the invention will now be described with reference to the accompanying drawing which depicts a portion of a hydrophone array.

The array comprises a large number of individual hydrophone assemblies 1, 2 etc. Each hydrophone assembly comprises an acousto-electric transducer 10 in a housing 11, usually a perforated metal canister, one face of the transducer 10 being in contact with one wall of the housing 11 and electrically connected thereto. The transducer 10 is electrically connected across the inputs of a high gain charge amplifier 12, with one electrical connection passing through an insulated lead-through 13 in the metal housing 11, the other electrical connection being to the housing 11. The housing 11 is, in turn, carried within a larger, perforated metal canister 14, which acts as a shield. The housing 11 is packed into the shield canister 14 with shock absorbing and insulating packing (not shown). The electrical connections to the transducer pass via insulated lead-throughs 15, 16 in the shield canister 14. The metal shield canisters 14 are all connected to a common ground wire 17 which is connected either to ground or to an oscillator 18 by changeover switch 19.

In normal use switch 19 is set to connect the ground wire 17 to ground. The acousto-electric transducers 10 respond to acoustic pressure waves in the sea and their outputs are amplified individually by the charge amplifiers 12. The amplified outputs are multiplexed to data processing equipment (not shown) on the ship towing the hydrophone array.

For calibration and/or testing purposes switch 19 is set to disconnect wire 17 from ground and connect it instead to the oscillator 18 which is thus placed in parallel with each of the transducers via the shield-to-housing capacitances. The housing behaves like a Faraday shield with respect to the local ground condition and hence each transducer should receive the same signal. Calibration and testing can now be carried out according to the system philosophy. Each amplifier 12 should receive the same input signal and produce the same output signal. This method of calibration does not require remote switching of individual transducers and therefore does not introduce feedthrough and crosstalk problems. Once calibration is completed switch 19 is reset to connect wire 17 to ground and disconnect it from the oscillator 18.

We claim:

1. A test and calibration arrangement for a hydrophone array comprising a plurality of two-terminal electro-acoustic transducers each contained in a pressure sensitive metal canister which is electrically connected to one terminal of the transducer contained therein, each canister being carried within a perforated metal shield, the canister being electrically isolated from the shield with electrical connections to the transducer passing through the shield via insulated lead-throughs, the shields of all the transducers being connected to a common wire leading to ground, the arrangement including a source of test signals and means for disconnecting said common wire from ground and connecting it to said source.

2. An arrangement according to claim 1 wherein the source of test signals is a local oscillator.

* * * * *